United States Patent [19]
Ito et al.

[11] Patent Number: 6,047,951
[45] Date of Patent: Apr. 11, 2000

[54] AIR PASSAGE SWITCHING SYSTEM FOR AIR CONDITIONER

[75] Inventors: Masahiro Ito, Takahama; Kousei Banno, Obu, both of Japan

[73] Assignees: Denso Corporation; Shimizu Industry Co. Ltd., both of Kariya, Japan

[21] Appl. No.: 09/209,389

[22] Filed: Dec. 10, 1998

[30] Foreign Application Priority Data

Dec. 24, 1997 [JP] Japan .................................. 9-355483

[51] Int. Cl.⁷ ...................................................... F16K 1/22
[52] U.S. Cl. ............................ 251/308; 251/306; 454/69
[58] Field of Search .................................... 251/305, 306, 251/308; 454/69, 121, 156; 165/202, 204

[56] References Cited

U.S. PATENT DOCUMENTS

| | | | |
|---|---|---|---|
| 4,032,108 | 6/1977 | Kintner | 251/306 |
| 4,402,486 | 9/1983 | Jacquet | 251/306 |
| 4,492,361 | 1/1985 | Jacquet et al. | 251/306 X |

FOREIGN PATENT DOCUMENTS

Y2-2505278  5/1996  Japan .

*Primary Examiner*—Harold Joyce
*Attorney, Agent, or Firm*—Harness, Dickey & Pierce, PLC

[57] ABSTRACT

An air passage switching system includes a case forming an air passage, and a butterfly door for opening and closing the air passage. The door includes a door body, a rotation shaft for rotating the door body, and a seal member attached to the door body. A link member is connected to a first end of the rotation shaft, and the first end of the rotation shaft is rotatably held in a shaft receiving portion of the case through the link member. A first cylindrical portion is formed in the door body concentrically with the rotation shaft at an outer peripheral side of the first end, and a second cylindrical portion protruding to a side of the door body is formed in the case. The first cylindrical portion and the second cylindrical portion are engaged so that a small gap is formed between an outer peripheral surface of the second cylindrical portion, and an inner peripheral surface of the first cylindrical portion and an end of the seal member. Further, the first and second cylindrical portions are overlapped in a longitudinal direction of the rotation shaft by a predetermined length. Thus, the door is air-tightly connected to the case around the rotation shaft, while it can prevent an operation force of the door from increasing.

10 Claims, 8 Drawing Sheets

AIR PASSAGE SWITCHING SYSTEM FOR AIR CONDITIONER

BACKGROUND OF THE INVENTION

1. Field of the Invention

The present invention relates to an air passage switching system having a butterfly door for opening and closing an air passage through which air flows. The air passage switching system is suitable for an air outlet mode switching unit for a vehicle air conditioner.

2. Related Art

A conventional air passage switching system for an air conditioner of a vehicle has an air conditioning case for forming an air passage, and a butterfly door for switching the air passage. A rotation shaft for rotating the butterfly door is disposed at side end centers of the door. The butterfly door is rotatably held in the air conditioning case to be rotated by the rotation shaft.

JP-Y2-2505278 and U.S. Pat. No. 4,402,486 respectively propose an air passage switching system in which a butterfly door is air-tightly connected to an air conditioning case around a rotation shaft. In JP-Y2-2505278, a seal member made of an elastic material such as rubber is attached to an outer peripheral portion of the door. The seal member has a brim-like protrusion portion around the rotation shaft of the door, and the protrusion portion of the seal member contacts an inner wall of the case while being pressed, so that the case around the rotation shaft is air-tightly sealed by the seal member. However, in JP-Y2-2505278, when the rotation shaft rotates the door, the protrusion portion of the seal member constantly slides on the inner wall of the case. Further, the seal member is made of an elastic material having a relatively large friction coefficient. Therefore, a sliding friction between the seal member and the case becomes larger, thereby increasing an operation force of the door. Further, due to a dimension tolerance between the door and the case in a longitudinal direction of the rotation shaft, the protrusion portion of the seal member may not air-tightly contact the inner wall of the case, and air may be leaked from the contacting portion between the protrusion portion of the seal member and the inner wall of the case.

Similarly, in U.S. Pat. No. 4,402,486, a seal member made of elastic material such as rubber is attached to an outer peripheral portion of the door. The seal member has a cylindrical portion extending to surround the rotation shaft of the door. A diameter of the cylindrical portion is decreased toward a top end of the rotation shaft. The top end of the cylindrical portion of the seal member, having a smaller diameter, is press-fitted to an outer circumferential surface of a cylindrical protrusion formed on an inner surface of the case, so that the case around the rotation shaft of the door is air-tightly sealed by the seal member. However, in U.S. Pat. No. 4,402,486, when the rotation shaft is rotated, the top end of the cylindrical portion of the seal member slides on the outer circumferential surface of the cylindrical protrusion of the case, thereby increasing the operation force of the door. Further, since the cylindrical portion of the seal member is made of elastic material such as rubber, the cylindrical portion is readily elastically deformed. Therefore, installation performance of the seal member to the outer circumferential surface of the cylindrical protrusion of the case may become difficult.

SUMMARY OF THE INVENTION

In view of the foregoing problems, it is an object of the present invention to provide an air passage switching system having a butterfly door, in which the door is air-tightly rotatably attached to a case forming an air passage while an operation force for rotating the door is decreased.

It is an another object of the present invention to provide an air passage switching system in which a butterfly door is readily installed in a case forming an air passage while a sufficient seal performance is proposed.

According to the present invention, an air passage switching system includes a case for forming an air passage and a butterfly door for opening and closing the air passage. The door has a door body, a rotation shaft for rotating the door body, and a seal member attached to the door body. A link member for rotating the rotation shaft is connected to a first end of the rotation shaft in a longitudinal direction of the rotation shaft. A first cylindrical portion is disposed in the door body at an outer peripheral side of the rotation shaft, and a second cylindrical portion is formed in the case to protrude toward the door. In the air passage switching system, the rotation shaft is coupled to the case in such a manner that a gap is formed between an outer peripheral surface of the second cylindrical portion and an inner circumferential surface of the first cylindrical portion, and between the outer peripheral surface of the second cylindrical portion and an end of the seal member of the door in a radius direction of the rotation shaft. Thus, when the rotation shaft is rotated to rotate the door body, a sliding friction force is not generated between the outer peripheral surface of the second cylindrical portion and the inner circumferential surface of the first cylindrical portion, and between the outer peripheral surface of the second cylindrical portion and the end of the seal member of the door in the radius direction. Further, the first cylindrical portion and the second cylindrical portion are overlapped by a predetermined length in the longitudinal direction. As a result, the door can be air-tightly rotatably attached to the case around the rotation shaft while an operation force for rotating the door is decreased.

Further, because each of the cylindrical portions is made of inelastic material, installation portions of the air passage switching door are readily assembled, and the butterfly door is readily installed in the case while a sufficient seal performance is proposed.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention are described hereinafter with reference to the accompanying drawings.

Figure 1:
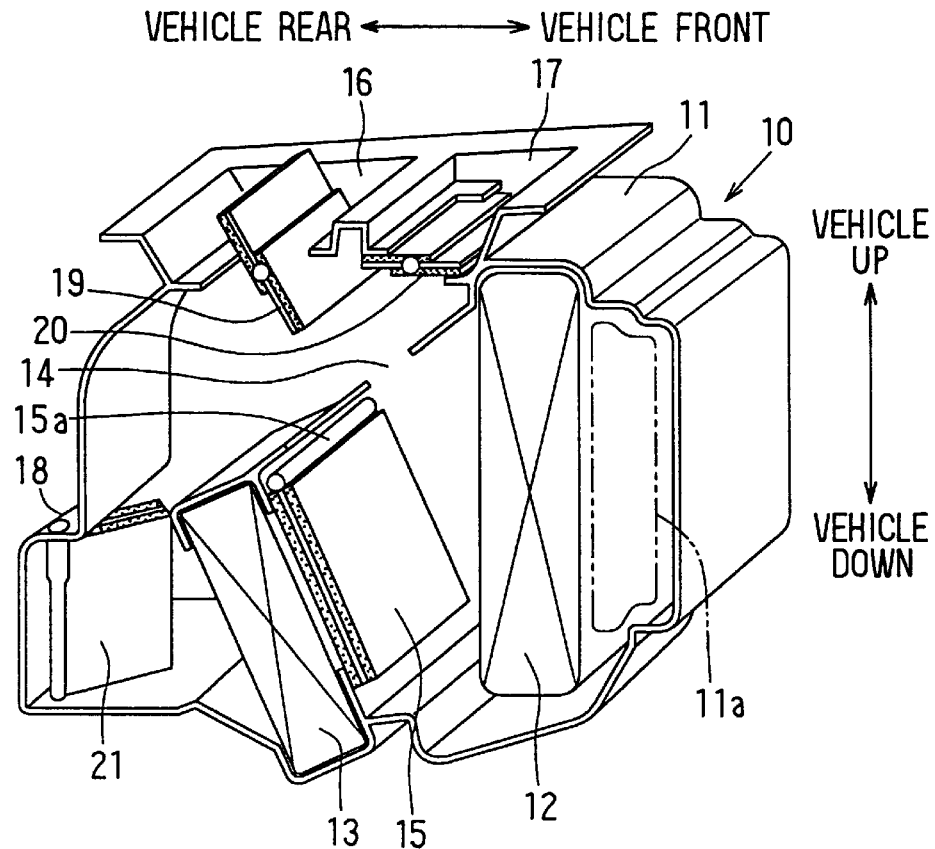
FIG. 1 is a schematic perspective view showing an air conditioner for a vehicle according to a first preferred embodiment of the present invention.

A first preferred embodiment of the present invention will be now described with reference to FIGS. 1 to 8. An air conditioning unit 10 of an air conditioner for a vehicle is disposed in a passenger compartment at an approximately center portion of an instrument panel (not shown) in a vehicle width direction (i.e., right-left direction). The instrument panel is disposed in a front part of the passenger compartment of the vehicle. In the first embodiment, the air conditioning unit 10 is installed in the vehicle to correspond to an arrangement direction of FIG. 1. A blower unit (not shown) is disposed in the passenger compartment at a front passenger's side shifted from the air conditioning unit 10 in the vehicle width direction. As shown in FIG. 1, the air conditioning unit 10 has an air conditioning case 11 which forms an air passage for leading air toward the passenger compartment. An air inlet 11a through which air is introduced into the case 11 is formed on a most front portion of the case 11. An outlet of the blower unit is connected to the air inlet 11a of the case 11, so that air blown by the blower unit flows into the case 11 through the air inlet 11a. Air introduced into the case 11 is cooled by an evaporator 12 of a refrigerant cycle, and then is heated by a heater core 13 which heats air using hot water (i.e., engine cooling water) as a heating source. An amount of air passing through the heater core 13 and an amount of air bypassing the heater core 13 is adjusted by a plate-like air mixing door 15 so that the temperature of air to be blown into the passenger compartment is adjusted to have a predetermined temperature.

The air mixing door 15 is rotated by a rotation shaft 15a in the case 11. A ratio between an amount of air passing through the heater core 13 and an amount of air passing through a bypass passage 14 through which air bypasses the heater core 13 is adjusted by controlling a rotation position of the air mixing door 15. The conditioned air is blown into the passenger compartment through at least one of three opening portions formed in the case 11. The three opening portions are a face opening 16 through which air is blown toward a head portion of a passenger in the passenger compartment, a defroster opening 17 through which air is blown toward an inner surface of a windshield of the vehicle, and a foot opening 18 through which air is blown toward a foot portion of the passenger.

Figure 2:
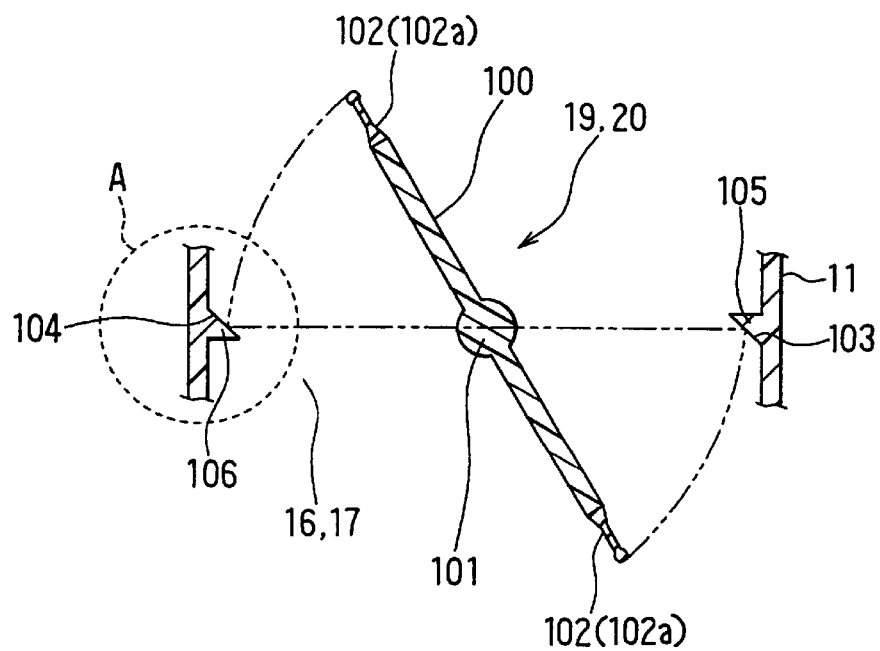
FIG. 2 is a schematic sectional view showing a butterfly door applied to the air conditioner in FIG. 1.

The face opening 16, the defroster opening 17, and the foot opening 18 are opened and closed, respectively, by a face door 19, a defroster door 20, and a foot door 21. The face door 19 and the defroster door 20 are butterfly doors as shown in FIGS. 1, 2.

Figure 3:
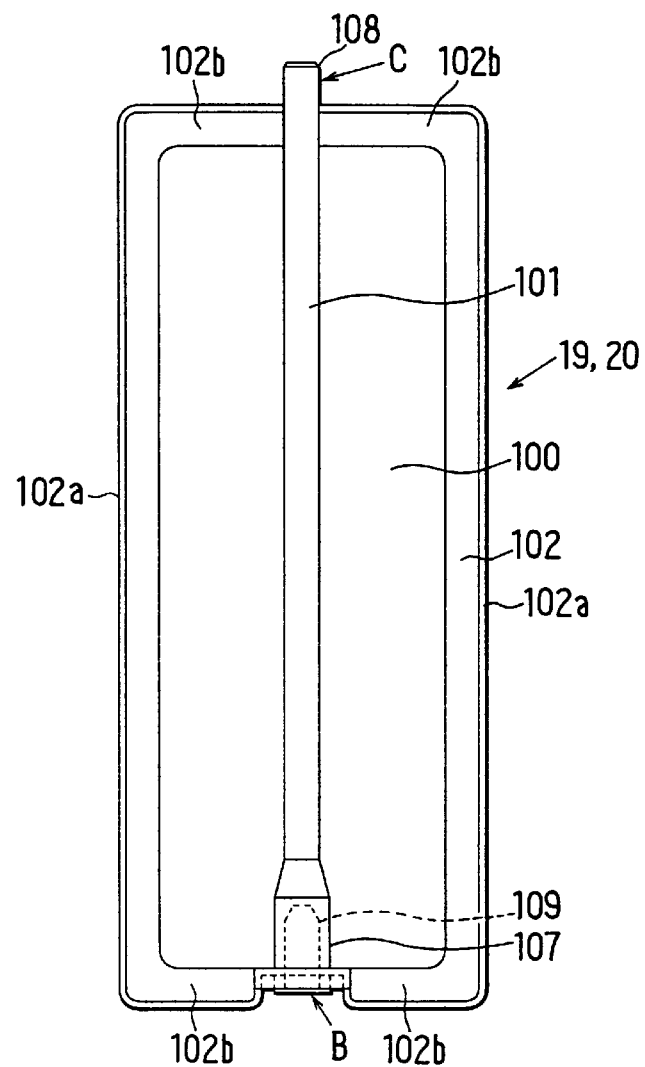
FIG. 3 is a top view showing the butterfly door according to the first embodiment.

Referring to FIG. 3, each of the butterfly doors 19, 20 has a door body 100 formed into a rectangular shape using an inelastic material having a high rigidity, such as resin. A rotation shaft 101 for rotating the door body 100 is integrally formed with the door body 100 to extend in a longitudinal direction of the door body 100, and is disposed at a center of the door body 100 in a lateral direction of the door body 100. Hereinafter, both side ends of each door 19, 20 in the lateral direction are referred to as lateral side ends, and both side ends of each door 19, 20 in the longitudinal direction are referred to as longitudinal side ends. A seal member 102 made of an elastic material such as rubber is attached to an outer peripheral portion of the door body 100 in such a manner that the door body 100 is framed by the seal member 102. The door body 100 and the seal member 102 can be integrally formed, for example. That is, a rubber material of the seal member 102 is inserted into a mold for forming the door body 100, at a preset position in the mold, thereafter a resin material of the door body 100 is injected into the mold, so that the door body 100 and the seal member 102 can be integrally formed.

Figure 4:
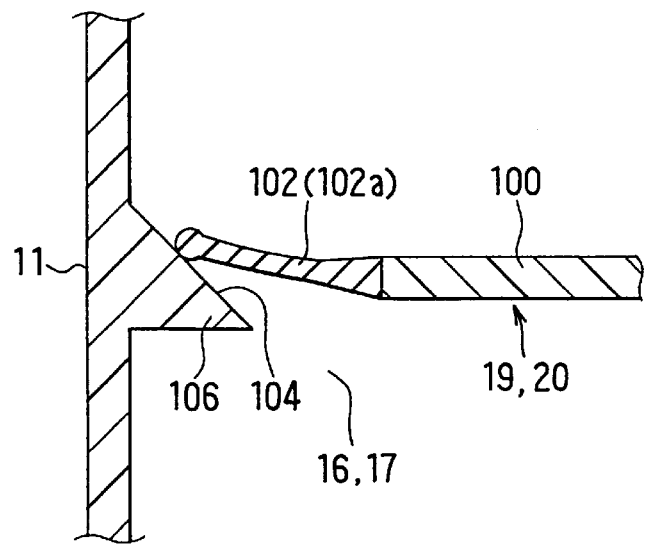
FIG. 4 is an enlarged view of a portion indicated by chain circle A in FIG. 2 when the door contacts an air conditioning case.

The door body 100 of the door 19, 20 is made of a resin material such as polypropylene, nylon and ABS resin. A filler such as glass fiber may be mixed into the resin material of the door body 100 to enhance a strength of the door body 100. The seal member 102 is made of an elastic material such as rubber, silicone rubber and thermoplastic elastomer (TPE). The case 11 may be made of the same resin material as that of the door body Referring to FIG. 2, the case 11 has door receivers 105, 106 protruding from the inner wall of the case 11 at the positions forming the face and defroster openings 16, 17. The door receivers 105, 106 respectively have an inclined surface 103, 104. A longitudinal peripheral portion 102a of the seal member 102 of the door body 100 air-tightly contacts the inclined surfaces 103, 104 of the door receives 105, 106, so that the openings 16, 17 of the case 11 can be sealed by the longitudinal peripheral portion 102a. FIG. 4 shows a state in which the longitudinal peripheral portion 102a of the seal member 102 is press-fitted to the inclined surface 104 of the door receiver 106. Due to the inclined surfaces 103, 104, a contacting-surface pressure between the seal member 102 and the case 11 is increased, and sealing-effect for air-tightly sealing the openings 16, 17 of the case 11 can be improved in the longitudinal side ends of the doors 19, 20.

On the lateral side ends of the door body 100, a lateral side portion 102b of the seal member 102 contacts door receivers 114, 115 (see FIG. 6) which protrude from the inner wall of the case 11 into the face and defroster openings 16, 17. Thus, the openings 16, 17 of the case 11 can be also air-tightly sealed along the lateral side ends of the doors 19, 20.

As shown in FIG. 3, the rotation shaft 101 of the door body 100 of the butterfly door 19, 20 has a recessed end portion 107 at one end "B" of the rotation shaft 101, and a protrusion end portion 108 at the other end "C" of the rotation shaft 101. A connection structure between the recessed end portion 107 of the rotation shaft 101 and the case 11 will be described in detail with reference to FIGS. 5–7.

Figure 5:
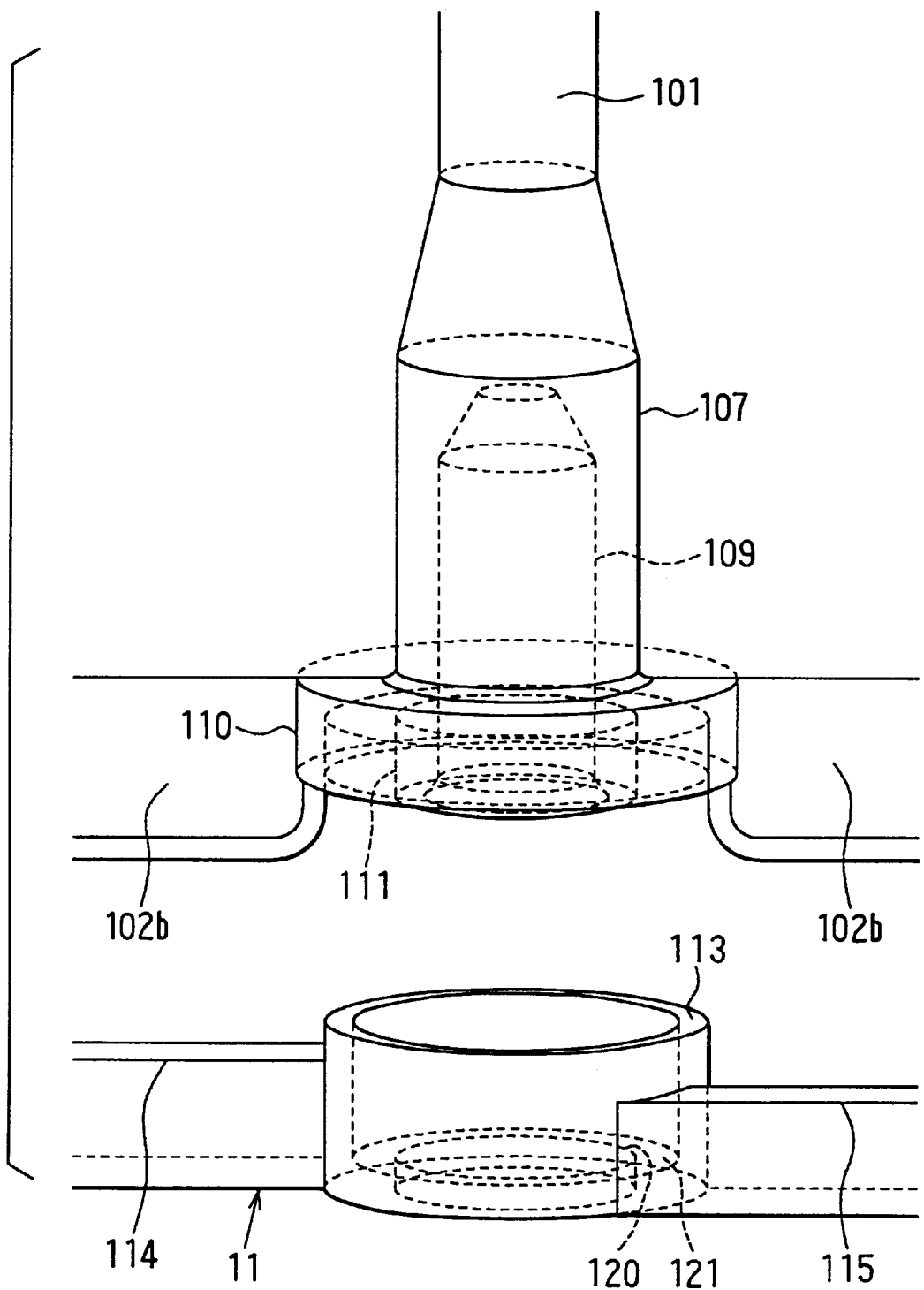
FIG. 5 is an exploded perspective view of a connection structure between a recessed end portion of a rotation shaft of the door and the case according to the first embodiment.

As shown in FIG. 5, the recessed end portion 107 has an outer diameter larger than that of the other portion of the rotation shaft 101, and has a link hole 109 extending in the longitudinal direction of the rotation shaft 101. The link hole 109 is opened at the end "B" of the rotation shaft 101, and has a bottom having a predetermined deepness away from the end "B". Further, an inner circumferential surface of the link hole 109 is partially made flat, so that the link hole 109 has a D-shaped cross-section. An open end portion of the recessed end portion 107 is formed into a double cylindrical portion consisting of an outer cylindrical portion 110 and an inner cylindrical portion 111, so that a circular groove 112 is formed between the outer and inner cylindrical portions 110, 111.

Figure 6:
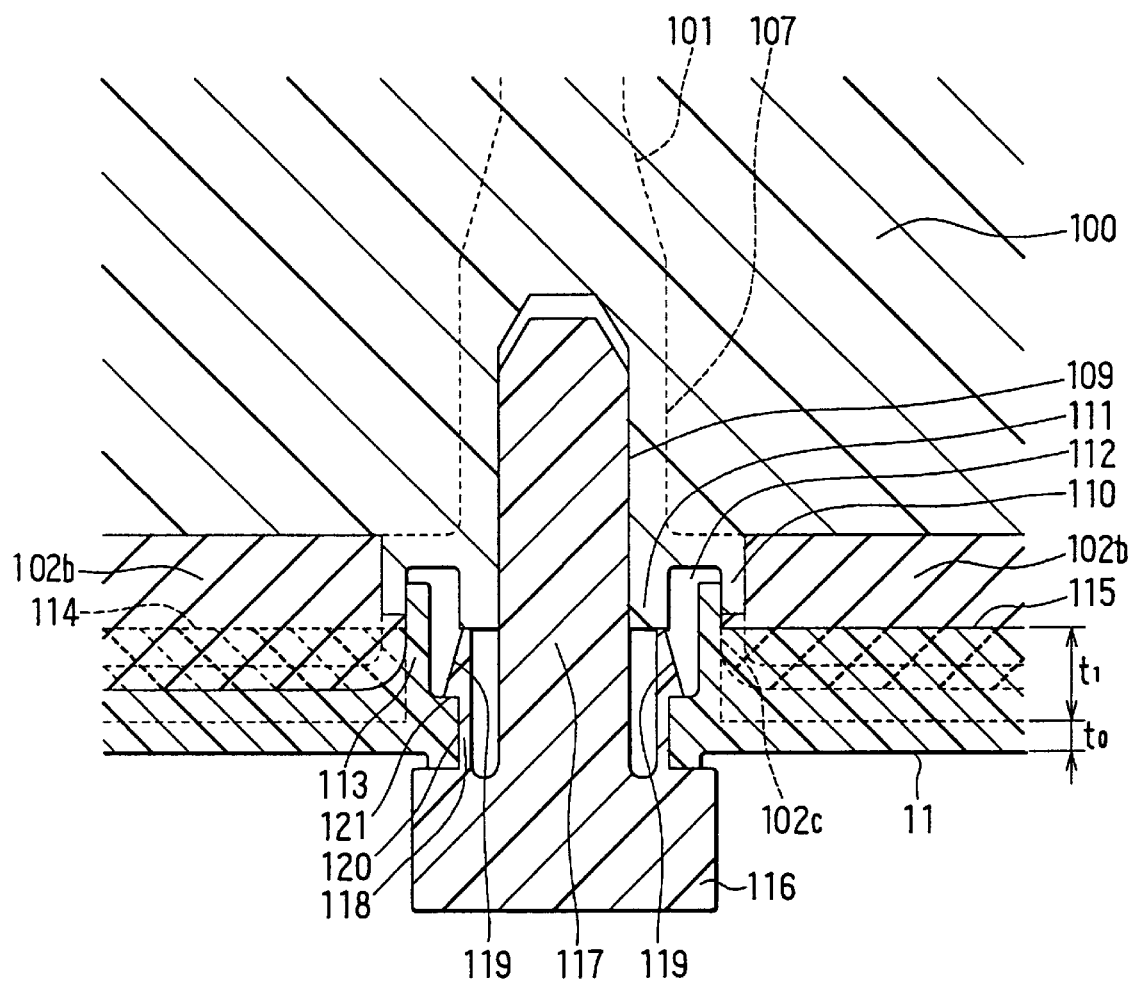
FIG. 6 is a schematic sectional view showing the recessed end portion of the butterfly door attached to the case through a link member according to the first embodiment.

On the other hand, the inner wall of the case 11 forming the face and defroster openings 16, 17 is integrally formed with a cylindrical portion 113 protruding inwardly from the case 11. Further, door receivers 114, 115 are also formed integrally with the inner wall of the case 11, and are disposed to be connected to the cylindrical portion 113 so that the cylindrical portion 113 is disposed between the door receivers 114, 115. As shown in FIG. 6, the case 11 has a thickness tot and the door receivers 114, 115 protrude from the case 11 by a length $t_1$.

As shown in FIG. 6, the door receivers 114, 115 are disposed alternately with respect to the lateral side portion 102b of the seal member 102. That is, when the door receiver 114 shown on a left side of FIG. 6 is disposed below the lateral side portion 102b of the seal member 102, the door receiver 115 shown on a right side of FIG. 6 is disposed above the lateral side portion 102b of the seal member 102. Further, each of the door receivers 114, 115 has an inclined surface similar to the inclined surfaces 103, 104 of the door receivers 105, 106, so that the sealing effect between the lateral side portion 102b of the seal member 102 and the door receivers 114, 115 of the case 11 is improved.

Figure 7:
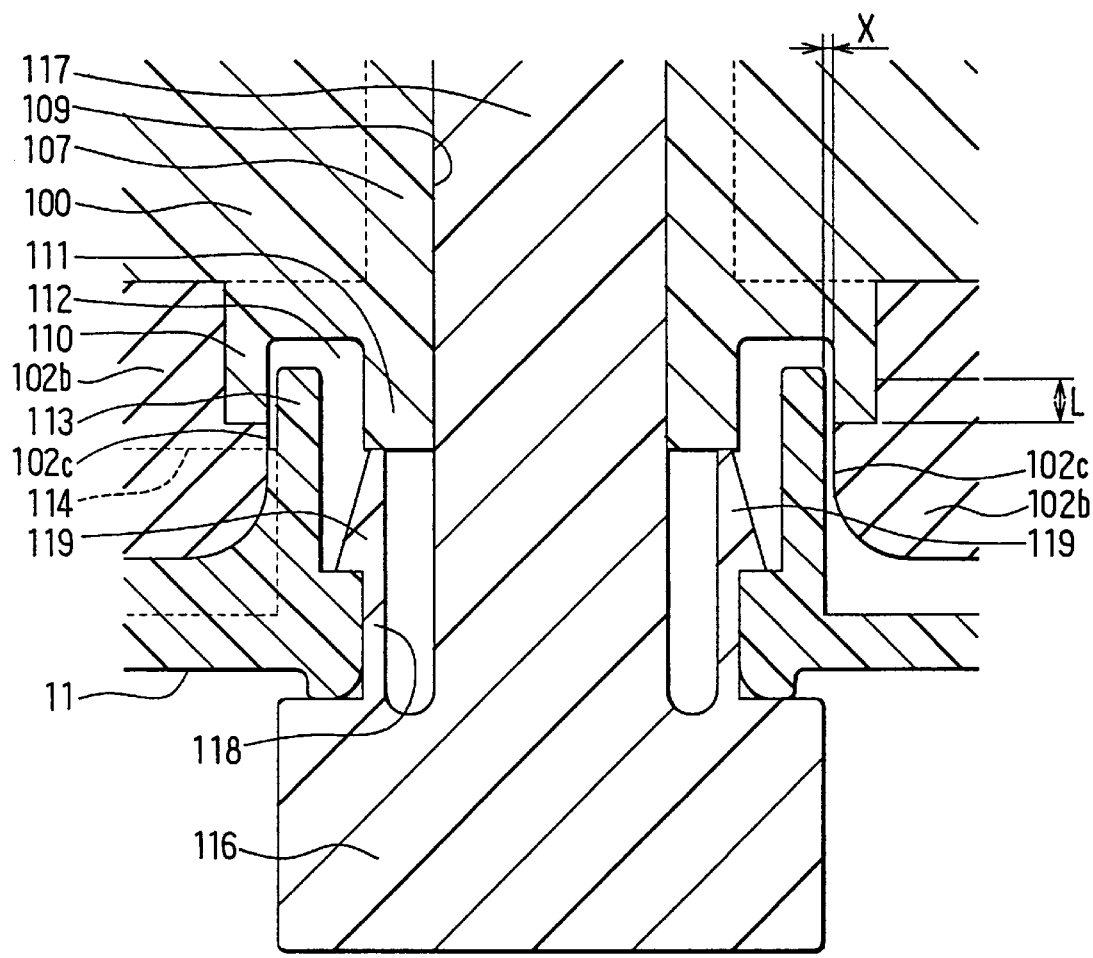
FIG. 7 is an enlarged view of a main portion in FIG. 6.

Further, an end portion of the cylindrical portion 113 of the case 11 is inserted into the circular groove 112 of the rotation shaft 101. As shown in FIGS. 6, 7, an inner diameter of the cylindrical portion 113 of the case 11 is set so that a sufficient clearance is formed between an inner circumferential surface of the cylindrical portion 113 and an outer circumferential surface of the inner cylindrical portion 111 of the rotation shaft 101. Further, an outer diameter of the cylindrical portion 113 of the case 11 is set so that a small gap X is formed between the inner circumferential surface of the outer cylindrical portion 110 and an outer circumferential surface of the cylindrical portion 113, and between an end portion 102c of the lateral side portion 102b and the outer peripheral surface of the cylindrical portion 113 in the radius direction. In the first embodiment, a dimension of the small gap X in the radius direction is set to 0.1–0.4 mm, more preferably is set to 0.1–0.2 mm, in consideration of a manufacturing tolerance. The cylindrical portion 113 and the outer cylindrical portion 110 are overlapped while the small gap X being formed therebetween by a length L in the longitudinal direction of the rotation shaft 101. The length L is set to 1–4 mm for effectively sealing of the case 11, more preferably is set to 2–3 mm.

A link member 116 made of resin such as polyacetal has a link shaft 117. The link member 116 constitutes a linkage mechanism for driving the door 19, 20. The link shaft 117 is integrally formed with the link member 116, and has a D-shaped cross-section corresponding to that of the link hole 109 of the recessed end portion 107 of the rotation shaft 101. The link shaft 117 is press-inserted into the link hole 109, so that the link member 116 is connected with the recessed end portion 107 of the rotation shaft 101, while preventing the link member 116 from idling.

Further, the link member 116 has a cylindrical portion 118 formed concentrically on an outer peripheral side of the link shaft 117. A plurality of elastically deformable latch portions 119 (e.g., four latch portions) branched from an end of the cylindrical portion 118 are formed integrally with the cylindrical portion 118. On the other hand, at a base of the cylindrical portion 113 of the case 11, a shaft receiving portion 121 having a shaft receiving hole 120 is formed. A diameter of the shaft receiving hole 120 is smaller than that of the cylindrical portion 113. The cylindrical portion 118 of the link member 116 is inserted into the shaft receiving hole 120 and is rotatably held in the shaft receiving portion 121, while each nail portion of the latch portions 119 is engaged with a step end portion of the shaft receiving portion 121.

Thus, the recessed end portion 107 of the rotation shaft 101 is rotatably held in the shaft receiving portion 121 of the case 11 through the link member 116, while the link member 116 is tightly engaged with the shaft receiving portion 121. The link member 116 is connected to and is driven by a manual operation member of a control panel of the air conditioner or an actuator using a motor through a link mechanism.

Figure 8:
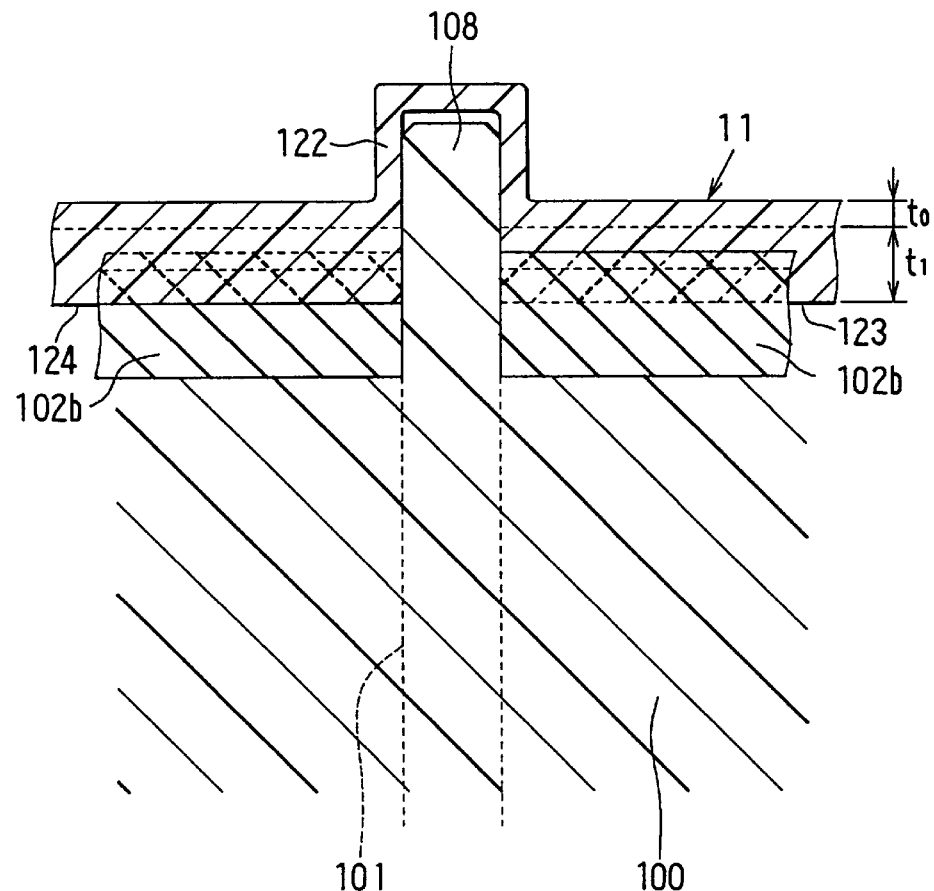
FIG. 8 is a schematic sectional view showing a protrusion end of the rotation shaft of the butterfly door attached to the case according to the first embodiment.

A holding structure of the protrusion end portion 108 at the end "C" of the rotation shaft 101 is described with reference to FIG. 8. As shown in FIG. 8, the inner wall of the case 11 forming the face and defroster openings 16, 17 has a shaft receiving portion 122 at a position corresponding to the protrusion end portion 108. The shaft receiving portion 122 is formed into a cylindrical shape having a closed bottom, and protrudes outwardly. The protrusion end portion 108 of the rotation shaft 101 is inserted into the shaft receiving portion 122 and is rotatably held therein. Further, door receivers 123, 124 protruding from the inner wall of the case 11 are integrally formed with the case 11, and are disposed at both sides of the shaft receiving portion 122.

Similarly to the above-described door receivers 114, 115, the door receivers 123, 124 are also disposed alternately with respect to the lateral side portion 102b of the seal member 102. That is, when the door receiver 123 shown on a right side of FIG. 8 is disposed below the lateral side portion 102b of the seal member 102, the door receiver 124 shown on a left side of FIG. 8 is disposed above the lateral side portion 102b of the seal member 102. Each of the door receivers 123, 124 also has an inclined surface similar to the inclined surfaces 103, 104 of the door receivers 105, 106, so that the sealing effect between the seal member 102 and the door receivers 123, 124 is enhanced. The lateral side portion 102b of the seal member 102 is integrally attached not only to the door body 100, but also to an outer peripheral surface of the protrusion end portion 108 of the rotation shaft 101.

Next, operation of the butterfly doors 19, 20 having the above-mentioned structure will be described. In FIG. 2, the butterfly door 19, 20 is opened. When the rotation shaft 101 is driven through the link member 116 to rotate the butterfly door 19, 20 by a predetermined angle in a counterclockwise direction, the longitudinal peripheral portion 102a of the seal member 102 is press-fitted to the inclined surfaces 103, 104 of the door receivers 105, 106. Thus, the opening portions 16, 17 of the case 11 are air-tightly sealed at the longitudinal side ends of the door 19, 20. On the other hand, the lateral side portion 102b of the seal member 102 also is press-fitted to the door receivers 114, 115 of the case 11. Therefore, the case 11 forming the openings 16, 17 also air-tightly sealed at the rotation shaft ends of the door body 100.

According to the first embodiment, the end of the cylindrical portion 113 of the case 11 is inserted into the circular groove 112 of the rotation shaft 101, so that the small gap X is formed between the outer peripheral surface of the cylindrical portion 113, and the inner peripheral surface of the outer cylindrical portion 110 of the rotation shaft 101 and the end portion 102c of the lateral side portion 102b of the seal member 102. The dimension of the small gap X in the radius direction is in a range of 0.1–0.4 mm, and the outer cylindrical portion 110 of the rotation shaft 101 is overlapped with the cylindrical portion 113 of the case 11 in the longitudinal direction by the length L of 1–4 mm. Therefore, air hardly leaks from the case 11 through the small gap X. Thus, even when the shaft receiving hole 120 is formed in the case 11 for attachment of the link member 116, the openings 16, 17 of the case 11 are air-tightly sealed sufficiently around the rotation shaft 101. Further, since the seal member 102 made of an elastic material having a relatively large friction coefficient does not slide the case 11 while contacting the case 11, the operation force for operating the door 19, 20 is prevented from increasing.

The cylindrical portion 118 of the link member 116 is rotatably held in the shaft receiving portion 121 of the case 11. Therefore, when the cylindrical portion 118 of the link member 116 rotates, a sliding friction occurs between the cylindrical portion 118 of the link member 116 and the shaft receiving portion 121 of the case 11. However, both the cylindrical portion 118 and the receiving portion 121 are made of an inelastic material having a little friction coefficient. Therefore, the operation force for operating the door 19, 20 is suppressed at minimum. Similarly, although the protrusion end portion 108 of the rotation shaft 101 slides on the shaft receiving portion 122 of the case 11, the protrusion end portion 108 and the shaft receiving portion 122 are both made of inelastic material. Therefore, the operation force for operating the door 19, 20 is suppressed at minimum.

A second preferred embodiment of the present invention will be described with reference to FIGS. 9, 10. In this and following embodiments, components which are similar to those in the first embodiment are indicated with the same reference numerals, and the explanation thereof is omitted.

In the above-described first embodiment, the rotation shaft 101 has the recessed end portion 107 having the link hole 109 at the end "B", and the link shaft 117 of the link member 116 is inserted into the link hole 109 so that the link member 116 is connected with the rotation shaft 101. In the second embodiment, a rotation shaft 101A has a protrusion end portion 108A at both ends "B", "C" of the rotation shaft 101A. The protrusion end portion 108A at the end "B" of the rotation shaft 101A has a cylindrical shaft portion 125. The cylindrical shaft portion 125 is inserted into the shaft receiving hole 120 of the shaft receiving portion 121 formed at a base of the cylindrical portion 113 of the case 11, and is rotatably held in the shaft receiving hole 120. An end of the protrusion end portion 108A of the rotation shaft 101A protrudes from the case 11 outwardly.

Figure 9:
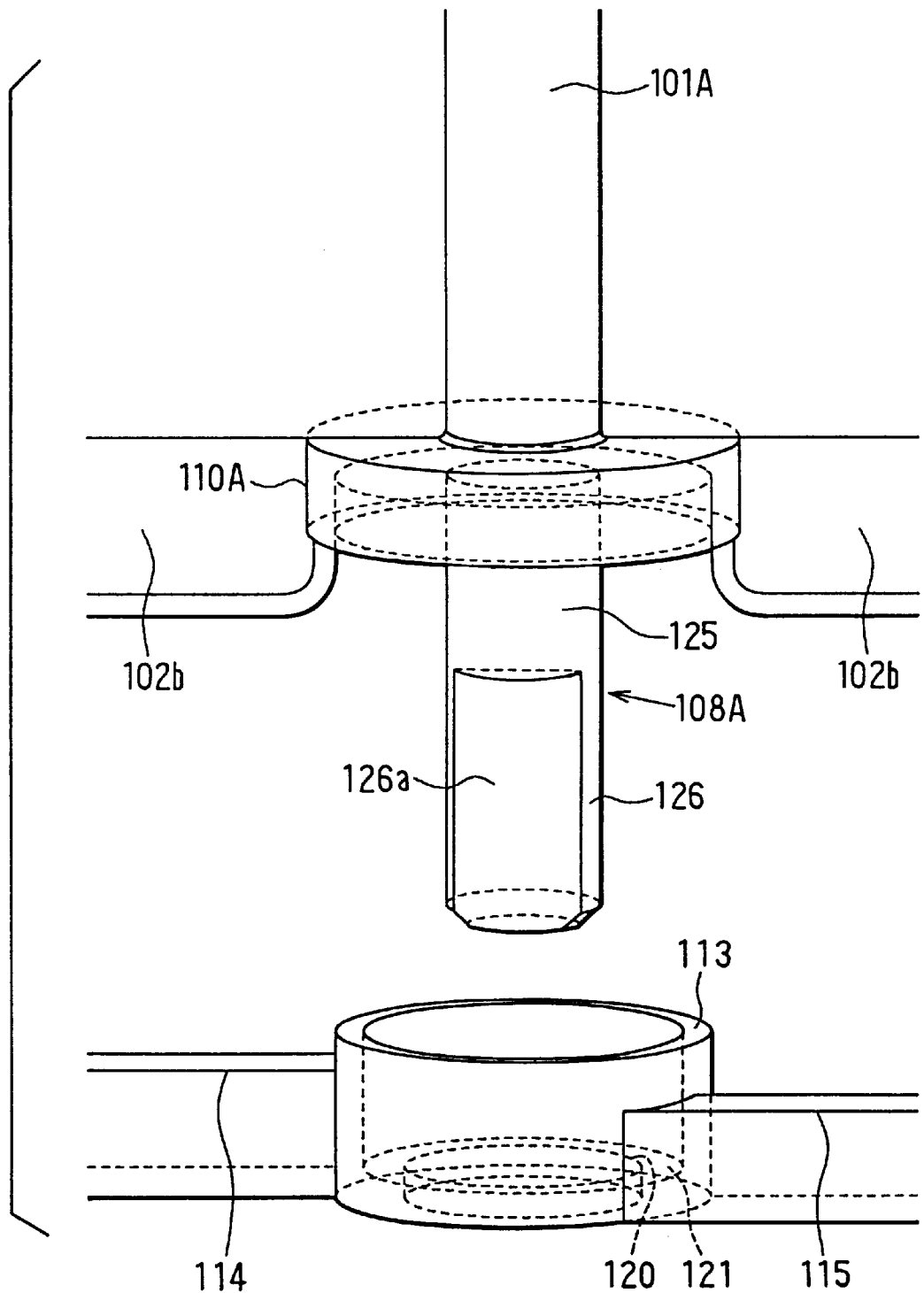
FIG. 9 is an exploded perspective view of a connection structure between a protrusion end portion of a rotation shaft of a butterfly door and an air conditioning case according to a second preferred embodiment of the present invention.
Figure 10:
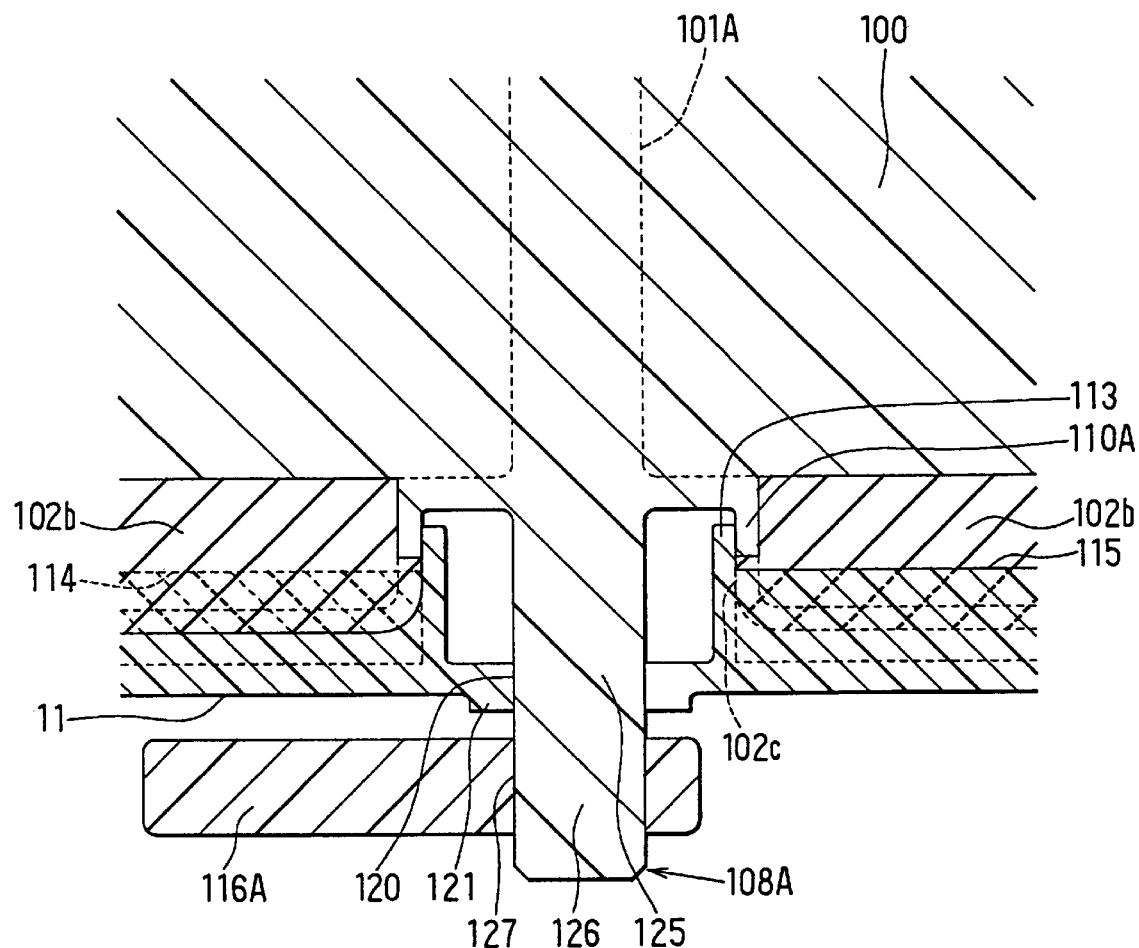
FIG. 10 is a schematic cross-sectional view showing the protrusion end portion of the rotation shaft attached to the case through a link member according to the second embodiment.

As shown in FIG. 9, a link portion 126 is formed into a D-shaped cross-section having a flat surface 126a, and is provided in the cylindrical shaft portion 125. On the other hand, as shown in FIG. 10, a link hole 127 having a D-shaped cross-section is formed in a link member 116A to correspond to the D-shaped cross-section of the link portion 126. The link portion 126 of the cylindrical shaft portion 125 is press-inserted into the link hole 127 of the link member 116A so that the link member 116A is connected with the protrusion end portion 108A of the rotation shaft 101A, while preventing the link member 116A from idling.

In the second embodiment, the inner diameter of the cylindrical portion 113 of the case 11 is set so that a sufficiently large opening is formed between the inner circumferential surface of the cylindrical portion 113 and an outer circumferential surface of the shaft portion 125 of the protrusion end portion 108A. Further, the outer diameter of the cylindrical portion 113 of the case 11 is set so that a small gap X is formed between the outer circumferential surface of the cylindrical portion 113, and the inner circumferential surface of a cylindrical portion 110A of the rotation shaft 101A and the end portion 102c of the lateral side portion 102b of the seal member 102. The cylindrical portion 113 of the case 11 is overlapped with the cylindrical portion 110A of the rotation shaft 101A by a length L in a longitudinal direction of the rotation shaft 101A. The dimension of the small gap X in the radius direction and the length L in the longitudinal direction are set similarly to those in the first embodiment.

According to the second embodiment, the protrusion end portion 108A of the rotation shaft 101A is connected with the link member 116A by inserting the protrusion end portion 108A into the link hole 127 of the link member 116A. The small gap X is also formed between the outer circumferential surface of the cylindrical portion 113 of the case 11, and the inner circumferential surface of the cylindrical portion 110A of the rotation shaft 101A and the end portion 102c of the lateral side portion 102b of the seal member 102. As a result, a sliding friction does not generate between the case 11 and the seal member 102. Thus, the same effect as in the first embodiment is also obtained in the second embodiment.

Figure 11:
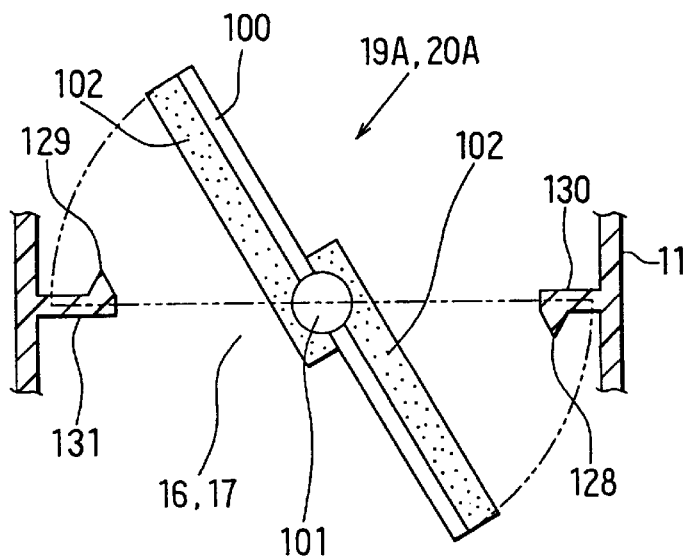
FIG. 11 is a schematic sectional view showing a butterfly door according to a third preferred embodiment of the present invention.

A third preferred embodiment of the present invention will be described with reference to FIG. 11. As shown in FIG. 11, a butterfly door 19A, 20A has the door body 100 made of a material having a high rigidity, such as resin. The rotation shaft 101 is integrally formed with the door body 100 at a center in the lateral direction of the door body 100. The rotation shaft 101 extends in the longitudinal direction of the door body 100 to protrude from the door body 100. The seal member 102 made of an elastic material such as rubber is attached to a half of one surface of the door body 100 on one side with respect to the rotation shaft 101, and to a half of the other surface of the door body 100 on a side opposite to the one side with respect to the rotation shaft 101. Door receivers 130, 131 are formed on the inner wall of the case 11 for forming the face and defroster openings 16, 17. The door receivers 130, 131 respectively have sealing protrusions 128, 129, which have an acute-angled tip and protrude in the opposite direction to each other. The seal member 102 attached to the door body 100 is press-fitted to the sealing protrusions 128, 129, so that an opening between the door receivers 130, 131 and the door body 100 can be air-tightly sealed. In the third embodiment, similarly to the first and second embodiments, a cylindrical portion (not shown) is formed on the recessed end portion 107 or the protrusion end portion 108 of the rotation shaft 101, and a small gap is formed between the outer circumferential surface of the cylindrical portion 113 of the case 11, and an inner circumferential surface of the cylindrical portion of the rotation shaft and the end portion 102c of the side portion 102b of the seal member 102. Thus, the openings 16, 17 of the case 11 are air-tightly sealed with the door 19A, 20A, while preventing the operation force of the door 19A, 20A from increasing.

Although the present invention has been fully described in connection with preferred embodiments thereof with reference to the accompanying drawings, it is to be noted that various changes and modifications will become apparent to those skilled in the art.

For example, the present invention is not limited to the air passage switching system of the air conditioner for the vehicle, but may be applied to an air passage switching system of various use.

Such changes and modifications are to be understood as being within the scope of the present invention as defined by the appended claims.

What is claimed is:

1. An air passage switching system comprising:
   a case for forming an air passage through which air flows;
   a door disposed rotatably in the case, for opening and closing said air passage, said door including
   a door body,
   a rotation shaft for rotating said door body, said rotation shaft having first and second ends in a longitudinal direction of said rotation shaft and disposed at a center portion of said door body, and
   a seal member made of an elastic material and attached to said door body,
   a link member connected to said first end of said rotation shaft, for rotating said rotation shaft;
   a first cylindrical portion disposed in said door body concentrically with said rotation shaft at an outer peripheral side of said first end of said rotation shaft; and
   a second cylindrical portion protruding from said case toward a side of said door, wherein:
   said rotation shaft is coupled to said case in such a manner that a gap is formed between an outer peripheral surface of said second cylindrical portion, and an inner peripheral surface of said first cylindrical portion and an end of said seal member of said door in a radius direction of said rotation shaft.

2. The air passage switching system according to claim 1, wherein:
   said case has a shaft receiving hole;
   said rotation shaft has a recessed link hole recessed from said first end in said longitudinal direction;
   said link member has a shaft portion extending in said longitudinal direction, and a third cylindrical portion provided concentrically at an outer peripheral side of said shaft portion to extend in said longitudinal direction;
   said shaft portion of said link member is inserted into said link hole of said rotation shaft to be connected to said rotation shaft; and
   said third cylindrical portion is rotatably held in said shaft receiving hole of said case.

3. The air passage switching system according to claim 1, wherein:
   said first end of said rotation shaft has a protrusion end portion protruding from said first end in said longitudinal direction;
   said case has a shaft receiving hole in which said protrusion end portion of said rotation shaft is rotatably held; and
   said link member has a link hole into which a top end of said protrusion end portion is inserted.

4. The air passage switching system according to claim 1, wherein:
   said first cylindrical portion has an inner diameter larger than an outer diameter of said second cylindrical portion; and
   said gap in said radius direction is in a range of 0.1–0.4 mm.

5. The air passage switching system according to claim 1, wherein:
   said first cylindrical portion and said second cylindrical portion are overlapped by a predetermined length in said longitudinal direction; and
   said predetermined length is in a range of 1–4 mm.

6. The air passage switching system according to claim 1, wherein:
   said case has a fourth cylindrical portion at a side of said second end of said rotation shaft, said fourth cylindrical portion having closed bottom end protruding outwardly; and
   said second end of said rotation shaft is inserted into said fourth cylindrical portion and is rotatably held therein.

7. The air passage switching system according to claim 1, wherein:
   said case includes a contact portion having an inclined surface to which said seal member is press-fitted when said door closes said air passage.

8. The air passage switching system according to claim 1, wherein each of said first and second cylindrical portions is made of an inelastic material having a predetermined rigidity.

9. An air passage switching system comprising:
   a case for forming an air passage through which air flows;
   a door disposed rotatably in said case, for opening and closing said air passage, said door including
   a door body,
   a rotation shaft for rotating said door body, said rotation shaft having first and second ends in a longitudinal direction of said rotation shaft and disposed at a center portion of said door body, and
   a seal member made of an elastic material and attached to said door body; and
   a link member connected to said first end of said rotation shaft, for rotating said rotation shaft; wherein:
   said door body has a first cylindrical portion disposed concentrically with said rotation shaft at an outer peripheral side of said first end so that a circular hole opened toward said case is defined by said first cylindrical portion; and
   said case has a second cylindrical portion extending toward said door, wherein:
   said second cylindrical portion of said case is inserted into said circular hole in such a manner that a gap is formed between an outer peripheral surface of said second cylindrical portion and an inner peripheral surface of said first cylindrical portion in a radius direction of said rotation shaft while said first cylindrical portion and said second cylindrical portion are overlapped in said longitudinal direction by a predetermined length.

10. The air passage switching system according to claim 9, wherein said seal member is attached to said door body so that the gap is formed between said outer peripheral surface of said second cylindrical member of said case and an end of said seal member in said radius direction.

* * * * *